3,094,384
METHOD OF CONTROLLING PROPERTIES OF POROUS METAL OXIDES
Ralph J. Bertolacini, Chesterton, and Harry M. Brennan, Hammond, Ind., assignors to Standard Oil Company, Chicago, Ill., a corporation of Indiana
No Drawing. Filed Sept. 29, 1958, Ser. No. 763,805
3 Claims. (Cl. 23—141)

This invention relates to porous metal oxides and, more particularly, to a method of treating hydrous metal oxides, prior to drying and calcining, whereby the surface area and pore size of the resulting product, after drying and calcining, are substantially altered.

Large quantities of porous metal oxides, i.e., alumina, silica, titania, zirconia, magnesia, boria, and gallia, are used in present-day manufacturing operations, particularly in the chemical and petroleum field, as adsorbents, catalysts, and as supports for other catalytic materials. Among the important physical properties of such metal oxides are surface area, pore diameter, pore volume, pore-size distribution, and the like. Such properties are usually dependent upon the particular starting materials from which the metal oxide is prepared and also the particular method of preparation. For any particular starting material and method of preparation, the surface area, pore size, and the like fall within a very narrow range. To adjust such properties to a different range, such as would be advantageous when selectively treating a particular size range of molecules, necessitates drastic measures, such as, for example, heating the material to very-high temperatures, steaming, and the like. Such measures often are accompanied by undesired side effects, such as decreased crushing strength and attrition resistance and destruction or modification of the catalytic properties of the material, for example, removal of activators, e.g., halogen in the case of alumina, or changing the crystalline structure of the material itself, e.g., from the active gamma, eta, or chi alumina phases to the inactive alpha phase.

It is therefore an object of the present invention to provide a method of adjusting or controlling surface area and/or pore size during preparation of the porous metal oxide. Another object is to lower pore size without resorting to very-high temperature treaments and the like. These and other objects of our invention will be apparent from the following description thereof.

We have discovered that the surface area and pore size of a metal oxide can be controlled by subjecting the metal oxide when it is in the hydrous form, i.e., prior to drying and calcining, to extreme pressure. Thus, in accordance with our invention, the hydrous metal oxide is pressured above about 10,000 pounds per square inch, preferably 15,000 to 200,000 pounds per square inch, following which the hydrous metal oxide is dried and calcined. The resulting calcined metal oxide has pores of smaller diameter and substantially altered surface area.

Pressuring of the hydrous metal oxide may be carried out by any conventional means. Conveniently, pressuring may be carried out by mechanical pressuring techniques and, preferably, by enclosing the hydrous metal oxide in a substantially non-porous elastic container, e.g., a thin-walled polyethylene container, and subjecting the container to hydraulic pressure. By enclosing the hydrous metal oxide in a substantially non-porous flexible container, contact of the porous metal oxide and hydraulic fluid is prevented, a desirable feature of such embodiment in many instances. Temperature during the pressuring operation may be ambient or higher. A time in excess of about 0.1 hour, e.g., 1 to 100 hours, is suitable. In general, longer periods within the range specified are required at the lower pressure levels for a given change in surface area and/or pore size. Likewise, higher pressures for a given time period usually result in greater changes, although increasing pressure above about 200,000 pounds per square inch does not appear to bring about substantial additional changes. In a specific embodiment, we prefer to subject the hydrous metal oxide to pressures in the range of about 50,000 to 150,000 pounds per square inch for a period of about 1 to 24 hours.

Our new technique is applicable to the treatment of hydrous metal oxides, which for the purpose of the present invention are defined as metal oxides which have not been subjected to substantial drying and/or calcination and contain water of hydration. For example, in the case of hydrous alumina, the alumina would contain 18 percent by weight, or more, of water, e.g., alumina hydrosols, alumina hydrogels, alumina ultragels, alpha alumina trihydrate, beta alumina trihydrate, alpha alumina monohydrate, and the like. Hydrous alumina is therefore to be differentiated from alumina which has been dried below the monohydrate level, even though such dried alumina often contains substantial (e.g., 1 to 10 percent) chemi-sorbed water, e.g., chi, gamma and eta alumina. (See "Alumina Properties," Technical Paper No. 10, revised by A. S. Russell et al., copyright 1956, Aluminum Company of America). The fact that our technique is applicable to metal oxides only when such metal oxides contain water of hydration suggests that our pressuring technique brings about a definite configuration in the structure of the metal oxide and water prior to dehydration. After dehydration, e.g., drying below a water content of 18 percent by weight, such structural configuration apparently can no longer be adjusted by pressuring. The above explanation, however, is advanced as one possibility only, and we do not necessarily wish to be bound or limited in any way thereby.

The hydrous metal oxide to be treated in accordance with the present invention may be prepared by methods of the prior art, the particular method of preparation per se not being part of the present invention. Other substances, e.g., other catalytic agents, may be added to the hydrous metal oxide before or after pressuring. Similarly, two or more hydrous metal oxides with or without other catalytic agents may be mixed or otherwise commingled before or after pressuring. For example, silica and alumina hydrosols may be commingled and then pressured in accordance with the present invention. After pressuring, drying and calcining, the resulting silica-alumina composite has substantially altered properties, e.g., decreased pore diameter. It is useful for a variety of purposes, e.g., as a catalyst for catalytic cracking of gas oils, as a catalytic support for platinum in naphtha reforming and/or light-hydrocarbon (pentane, hexane, etc.) isomerization reactions, and the like.

A particularly advantageous type of hydrous alumina for use in practicing our invention is alumina hydrosol prepared by the technique described in Heard Reissue 22,196 (October 6, 1942). According to this technique, aluminum metal in the form of sheets, granules, turnings, sawdust, chips, shot, rings, irregular shapes, or the like, is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent. The reaction goes forward readily at ordinary or autogenous pressures and at temperatures above about 100° F., preferably between about 125 and 160° F. Thick, viscous hydrosols can be obtained at temperatures above about 160° F., while relatively thin hydrosols, which are preferred, are obtained at temperatures below about 160° F. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrous-alumina product is a syrupy liquid of opalescent, nearly transparent appearance, containing from around 2 to 10 percent by weight of $Al_2O_3$.

The hydrous alumina, prepared as described above, may be treated in accordance with our invention directly. Alternatively, an electrolyte, e.g., ammonium hydroxide, may be added to convert the hydrosol to a gel, or, at high pH's, i.e., pH's in excess of 8.5, to convert the hydrosol to a precipate of solid hydrous alumina, which may then be pressured. After pressuring the hydrous alumina may be dried, e.g., at about 200 to 600° F. for 1 to 24 hours, and calcined, e.g., at about 600 to 1200° F. for about 1 to 24 hours. The drying and calcining may be carried out as one continuous step, that is, by raising temperature over a period of time until calcination temperatures are reached. Subjecting hydrous metal oxides to calcination temperatures without preliminary drying is not advisable because rapid release of water of hydration may create internal pressures within the metal oxide, and thus lead to fissures, cracks, and the like.

The porous metal oxide produced in accordance with our invention can be prepared in any of the usual mechanical forms. It can be ground to a powder for use in fluidized form. It can be broken into irregular fragments. It can be prepared in various shapes, such as pills, pellets, rings, rosettes, saddles, and the like as desired. It may be suitable per se as a catalyst for various processes or may act as a catalyst support or co-catalyst with other catalytic materials. For example, alumina produced in accordance with the present invention may be employed for the dehydration of alcohols, the reaction of methanol and ammonia to produce methylamines, the vapor-phase finishing of synthetic gasolines, and the like. The alumina is also a highly satisfactory support for various other catalytic materials, such as molybdena, chromia, platinum, nickel, and the like. The addition of such other substances to the alumina is conveniently carried out before, or after our treatment, preferably after, according to the techniques described in the art, e.g., cogelling, impregnation and the like. The resulting catalyst will have a smaller pore diameter than would be obtainable without our pressuring step.

Alumina of adjusted pore size and surface area is broadly useful for the conversion of hydrocarbons, e.g., reforming, isomerization, hydrogenation, hydrocracking, dehydrogenation, and other reactions known in the art. The required processing conditions depend upon the specific reactions, the charging stocks involved, and the presence or absence of other catalytic materials, and may readily be determined from the teachings of the prior-art. By adjusting pore size of alumina in accordance with our invention, reaction of molecules of certain sizes, that is, molecules small enough to fit within the adjusted pores, may be favored. For such purposes the pores of the alumina usually contain other catalytic substances, as described above. A typical example is platinum-alumina hydroforming wherein it is often advantageous to reform the smaller hydrocarbon molecules and to minimize the reaction of larger molecules which form substantial coke. Alumina of adjusted pore size may also be advantageously used for separation purposes, e.g., as a molecular sieve.

The following specific examples will more clearly illustrate the technique and advantages of our invention.

*Example I*

A Heard-type alumina hydrosol was prepared by reacting metallic aluminum pellets with water in the presence of mercuric oxide and dilute acetic acid. The resulting hydrosol was concentrated by evaporation at 90° C. for about one-and-a-half hours. This evaporation removed excess water and decreased the volume of the hydrosol by about one-third.

One portion of the concentrated hydrosol was then dried at about 250° F. for about two hours and calcined at about 1000° F. for six hours. Another portion of the same concentrated hydrosol was sealed in a thin-walled, flexible polyethylene container and placed within an extreme-pressure chamber where it was subjected to pressures in the range of about 75,000 to 100,000 pounds per square inch gage for a period of about 18 hours. Distilled water was used as the hydraulic fluid. After depressuring, the hydrosol was removed from the polyethylene container and was dried and calcined in exactly the same way as described above for the first portion. Analysis of the two porous aluminas were as follows:

|  | Surface Area, M.²/gram | Micro-Pore Volume, cc./gram | Avg. Pore Diameter, Angstroms |
| --- | --- | --- | --- |
| Without pressuring | 280 | 0.49 | 70 |
| With pressuring | 259 | 0.43 | 66 |

Comparison of this data shows that pressuring hydrous alumina in accordance with our invention lowers the surface area, pore volume, and pore diameter. No change in the alumina phase (gamma) resulted.

*Example II*

A Heard-type alumina hydrosol prepared as described above was raised to a pH of about 11–12 for about 2 hours by addition of ammonium hydroxide until finely-divided, white hydrous alumina was formed. One portion of the resulting hydrous alumina was dried at about 250° F. for about 2 hours and calcined at about 1000° F. for about 6 hours. Another portion was sealed in a thin-walled, flexible polyethylene container, placed in an extreme pressure chamber, and held at pressures within the range of about 70,000 to 100,000 pounds per square inch gage for about 18 hours. Distilled water was used as the hydraulic fluid. After releasing pressure, the hydrous alumina was removed from the polyethylene container and was dried and calcined in the same way as described above. Analysis of the two porous aluminas are as follows:

|  | Surface Area, M.²/gram | Micro-Pore Volume, cc./gram | Avg. Pore Diameter, Angstroms |
| --- | --- | --- | --- |
| Without pressuring | 271 | 0.49 | 72 |
| With pressuring | 249 | 0.35 | 57 |

Here again, surface area, pore volume, and pore diameter were substantially reduced. Again no change in the alumina type occurred.

*Example III*

Hydrous silica was prepared by diluting 20 milliliters of reagent-grade sodium silicate with 80 milliliters of distilled water and adding thereto an excess of 17 percent sulfuric acid. One portion of the resulting hydrous silica was dried at about 250° F. for about 2 hours and calcined at about 1000° F. for about 6 hours. Another portion was sealed in a thin-walled, flexible polyethylene bag and held at pressures within the range of about 85,000 to 100,000 pounds per square inch gage for about 24 hours. Distilled water was used as the hydraulic fluid. After releasing pressure, the resulting hydrous silica, which had apparently increased slightly on volume and was separated into two layers until about 15 minutes after depressuring, was removed from the polyethylene bag and was dried and calcined in the same way as described above. Analysis of the two porous silicas are as follows:

|  | Surface Area, M.²/gram | Micro-Pore Volume, cc./gram | Avg. Pore Diameter, Angstroms |
|---|---|---|---|
| Without pressuring | 1.63 | 0.005 | 125 |
| With pressuring | 1.54 | 0.003 | 67.7 |

It is apparent from comparison of the above data that pressuring lowers surface area, pore volume, and pore diameter. The relatively-low surface area and pore volume in both samples results from the large excesses of other substances present, e.g., Na. Washing of the hydrous silica before or after pressuring removes extraneous substances and the resulting porous silica, after drying and calcining, has substantially larger surface area and pore volume.

*Example IV*

A portion of a commercially-available colloidal silica sol (Du Pont "Ludox") was dried at about 250° F. for about 16 hours. Another portion was sealed in a thin-walled polyethylene bag and held at pressures in the range of about 78,000 to 100,000 pounds per square inch gage at ambient temperatures for about 18 hours. Distilled water was used as the hydraulic fluid. After releasing pressure, the resulting hydrous silica was dried as above described. Analysis of the two resulting porous silicas are as follows:

|  | Avg. pore diameter, Angstroms |
|---|---|
| Without pressuring | 60.4 |
| With pressuring | 54.9 |

While we have described our invention with reference to certain specific examples in the operating embodiments, it is to be understood that such embodiments are illustrative only and not by way of limitation. Numerous additional embodiments of the invention, will be apparent from the foregoing description to those skilled in the art.

This application is a continuation-in-part of our application Serial No. 673,569, filed July 23, 1957, now abandoned.

In accordance with the foregoing description, we claim as our invention:

1. A method of preparing porous alumina of decreased pore size which comprises pressuring hydrous alumina while in a deformable nonsolid state, prior to drying and calcining, to pressures in the range of about 50,000 to 150,000 pounds per square inch for a period in the range of about 0.1 to 100 hours, depressuring and thereafter drying and calcining.

2. A method of preparing alumina of decreased pore size and surface area, which method comprises subjecting an alumina hydrogel to pressures in excess of about 50,000 p.s.i. for a period in the range of about 0.1 to 100 hours, depressuring, and thereafter drying and calcining.

3. A method of preparing silica of decreased pore diameter, which method comprises subjecting a silica hydrosol to pressures in excess of about 50,000 p.s.i. for a period in the range of about 0.1 to 100 hours, depressuring and thereafter drying and calcining.

References Cited in the file of this patent

UNITED STATES PATENTS

| | | |
|---|---|---|
| Re. 22,196 | Heard | Oct. 6, 1942 |
| 2,358,202 | Behrman | Sept. 12, 1944 |
| 2,499,675 | Owen | Mar. 7, 1950 |
| 2,698,305 | Plank et al. | Dec. 28, 1954 |
| 2,773,842 | Kimberlin et al. | Dec. 11, 1956 |
| 2,774,651 | Loftman | Dec. 18, 1956 |
| 2,809,170 | Cornelius et al. | Oct. 8, 1957 |
| 2,833,727 | Mavity et al. | May 6, 1958 |
| 3,010,791 | Allen | Nov. 28, 1961 |